(12) United States Patent
Takaoka (10) Patent No.: US 7,190,494 B2
(45) Date of Patent: Mar. 13, 2007

(54) COMMUNICATION TERMINAL AND A METHOD OF CONTROLLING THE SAME

(75) Inventor: Tatsuo Takaoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1030 days.

(21) Appl. No.: 10/183,739

(22) Filed: Jun. 27, 2002

(65) Prior Publication Data

US 2003/0011826 A1    Jan. 16, 2003

(30) Foreign Application Priority Data

Jul. 16, 2001 (JP) .............................. 2001-215666

(51) Int. Cl.
*H04N 1/32* (2006.01)
*H04N 1/00* (2006.01)

(52) U.S. Cl. ..................... 358/468; 358/400

(58) Field of Classification Search ................ 358/400, 358/401, 404, 444, 468, 405, 407; 379/100.01
See application file for complete search history.

(56) References Cited

U.S. PATENT DOCUMENTS 5,675,630 A * 10/1997 Beatty ..................... 455/551

6,141,695 A * 10/2000 Sekiguchi et al. ............ 709/246
6,980,331 B1* 12/2005 Mooney et al. .............. 358/400
2002/0135813 A1* 9/2002 Tanimoto ..................... 358/402

FOREIGN PATENT DOCUMENTS

EP    0863659 A2 *  9/1998

* cited by examiner

Primary Examiner—Jerome Grant
(74) Attorney, Agent, or Firm—Cooper & Dunham LLP (57) ABSTRACT

A communication terminal apparatus includes a manual call-sending part for manually sending calls, a communication part capable of performing communication procedures after a connection has been established manually, an automatic call-sending part for automatically sending calls and destination information storage part in which information associated with destination terminals is preset and which is referred to by the automatic call-sending part. The destination information storage part further includes data indicating whether to perform a manual operation. For a manual operation, the communication part disconnects the line and sends tone signals representative of a telephone number of a destination terminal of the facsimile service information provider.

10 Claims, 11 Drawing Sheets

| ○ READY TO SEND<br>VIA FACSIMILE | SET ORIGINAL SHEETS AND<br>SPECIFY DESTINATION |
|---|---|
| MEMORY TRANSMISSION | 100% |
| | |
| [EXTENDED TRANSMISSION] [COMMUNICATION INFO] | |

FIG.3B

■ INITIAL SETTINGS                    SELECT ITEM NUMBER

1. SYSTEM SETTINGS     2. KEY OPERATOR SETTINGS
3. USER FUNCTION SETTINGS (NEXT PAGE)        END

FIG.3C

■ SYSTEM SETTINGS                     SELECT ITEM NUMBER

1. PRESET/DELETE      2. PRINT LISTS/REPORTS
3. TRANSMIT INITIAL SETTINGS
4. RECEIVE INITIAL SETTINGS
   (PREVIOUS PAGE)    (NEXT PAGE)    PREVIOUS MENU

FIG.3D

■ PRESET/DELETE                       SELECT ITEM NUMBER

01 PRESET/MODIFY DESTINATION   02 DELETE DESTINATION
03 PRESET/MODIFY GROUP         04 DELETE GROUP (PREVIOUS PAGE)    (NEXT PAGE)    END

FIG.4A

| <PRESET/MODIFY DESTINATION> |
|---|
| PRESS KEY NUMBER FOR WHICH DESTINATION IS TO BE PRESET OR MODIFIED      KEY (01–64) |
| STATUS OF PRESET DATA      PREVIOUS MENU |

FIG.4B

| <PRESET/MODIFY DESTINATION> | | INPUT FAX NUMBER | |
|---|---|---|---|
| Tel. 045-6787890 | | | |
| | | | |
| DESTINATION NAME | CONDITIONS | CANCEL | OK |

FIG.4C

| <PRESET/MODIFY DESTINATION> | | INPUT DESTINATION NAME | |
|---|---|---|---|
| ABC SERVICE | | | |
| | | | |
| DESTINATION NAME | CONDITIONS | CANCEL | OK |

FIG.4D

| <CONDITIONS> | SELECT ITEM NUMBER FOR REQUIRED FUNCTION |
|---|---|
| 1. INSERT DESTINATION     2. OVERSEA TRANSMISSION 3. FACSIMILE INFORMATION SERVICE | |
| | COMPLETED |

FIG.5A

| <FACSIMILE INFORMATION SERVICE> | | SELECT BY ← → | |
|---|---|---|---|
| MANUAL CONNECTION | | [YES] | [NO] |
| [↓]   [↑] | | CANCEL | OK |

FIG.5B

| <PRESET/MODIFY DESTINATION> | | INPUT FAX NUMBER | |
|---|---|---|---|
| Tel. 045-6787890 | | | |
| (DESTINATION NAME: ABC SERVICE: FACSIMILE INFORMATION SERVICE) | | | |
| DESTINATION NAME | CONDITIONS | CANCEL | OK |

| DESTINATION NUMBER INFORMATION |
|---|
| NAME OF DESTINATION |
| MANUAL CONNECTION FLAG |
| MANUAL COMMUNICATION FLAG |
| ACCESS PROCEDURE INFORMATION TABLE |

COMMUNICATION TERMINAL AND A METHOD OF CONTROLLING THE SAME

BACKGROUND OF THE INVENTION

1. Field of the Invention

The present invention generally relates to a communication terminal and particularly relates to a communication terminal and a method for sending predetermined tone signals after disconnecting the line in order to receive predetermined services from service providers.

2. Description of the Related Art

Presently, various facsimile information providers offer facsimile information services for distributing a wide variety of facsimile image information. When a user wishes to use such a facsimile information service, he/she uses a handset of a facsimile apparatus or an external telephone to make a call to a facsimile information service terminal by a manual operation. Then, the user follows a voice guide given by the facsimile information service to carry out manual operations that are required for the desired facsimile information service. Manual operations may be operations such as switching on the numeric keys (i.e., sending PB signals).

When the start key of the facsimile apparatus is switched ON, a predetermined receiving process is initiated to receive user-requested image information from the facsimile information service terminal. The received image information is recorded and output by the facsimile apparatus.

However, as has been described above, it is necessary for the user to make manual operations every time he/she wishes to use such a facsimile information service. Therefore, for example, for a facsimile information service regularly distributing facsimile image information, the user should make manual operations on a regular basis. Accordingly, it is troublesome for the user to make use of such facsimile information services.

SUMMARY OF THE INVENTION

Accordingly, it is a general object of the present invention to provide a communication terminal that can obviate the problem described above.

It is another and more specific object of the present invention to provide a communication terminal for achieving easy access to facsimile information services provided via a network and a method of controlling such a communication terminal.

According to the present invention, a communication terminal apparatus is provided which includes:

a manual call-sending part for sending calls in a manual manner;

a communication part capable of performing communication procedures after a connection has been established in a manual manner;

an automatic call-sending part for sending calls in an automatic manner; and a destination information storage part in which information associated with destination terminals is preset and which is referred to by the automatic call-sending part.

The destination information storage part further includes data indicating whether to perform a manual operation. When a manual operation is to be performed, the communication part disconnects the line and sends tone signals representative of a telephone number of a destination terminal of the facsimile service information provider.

With the above-mentioned communication apparatus, efforts required by the user are significantly reduced. Further, according to the present embodiment, later input operations of the telephone numbers being made by the user can be reduced.

Further, according to the present invention, the destination information further includes a service number and information used after the connection has been established, such as time-delay information. The service number and the information such as time-delay information are used for receiving service information from the destination terminal of the facsimile service information provider. In another embodiment, the destination information further includes a service number and information used after the connection has been established, such as time-delay information. The the service number and the information such as time-delay information are used for performing predetermined procedures for receiving service information from the destination terminal. The communication part is started up in an information receiving step in the predetermined procedures for receiving service information from the destination terminal.

Therefore, since the procedures for retrieving the facsimile service information from the facsimile service information provider are prestored, efforts required by the user are significantly reduced.

Also, according to the present invention, a communication terminal apparatus is provided which includes:

an automatic call-sending part for sending calls in an automatic manner; and a destination information storage part in which a service number and information used after the connection has been established, such as time-delay information, are stored.

When a connection is established between the communication terminal apparatus and the destination terminal, the service number and the time-delay information are used for performing predetermined procedures for receiving service information from the destination terminal. The communication part is started up in an information receiving step in the predetermined procedures for receiving service information from the destination terminal.

Further, according to the present invention, a method of receiving service information from a facsimile service information provider is provided which method includes the steps of:

a) presetting destination information used for an automatic call-sending operation;

b) setting a manual operation flag in the destination information;

c) determining whether the manual operation flag indicates that a manual operation is to be carried out;

d) when the result of the step c) is negative, performing an automatic call-sending operation;

e) when the result of the step c) is positive, performing a manual call-sending operation by disconnecting the line and then sending tone signals representative of a telephone number of a destination terminal of the facsimile service information provider;

f) receiving service information from the service information provider; and g) reconnecting the line.

With the above-mentioned method, efforts required by the user are significantly reduced. Further, according to the present embodiment, possibility of later input operations of the telephone numbers being made by the user can be reduced.

DETAILED DESCRIPTION OF THE PREFERRED EMBODIMENTS

In the following, principles and embodiments of the present invention will be described with reference to the accompanying drawings.

Figure 1:
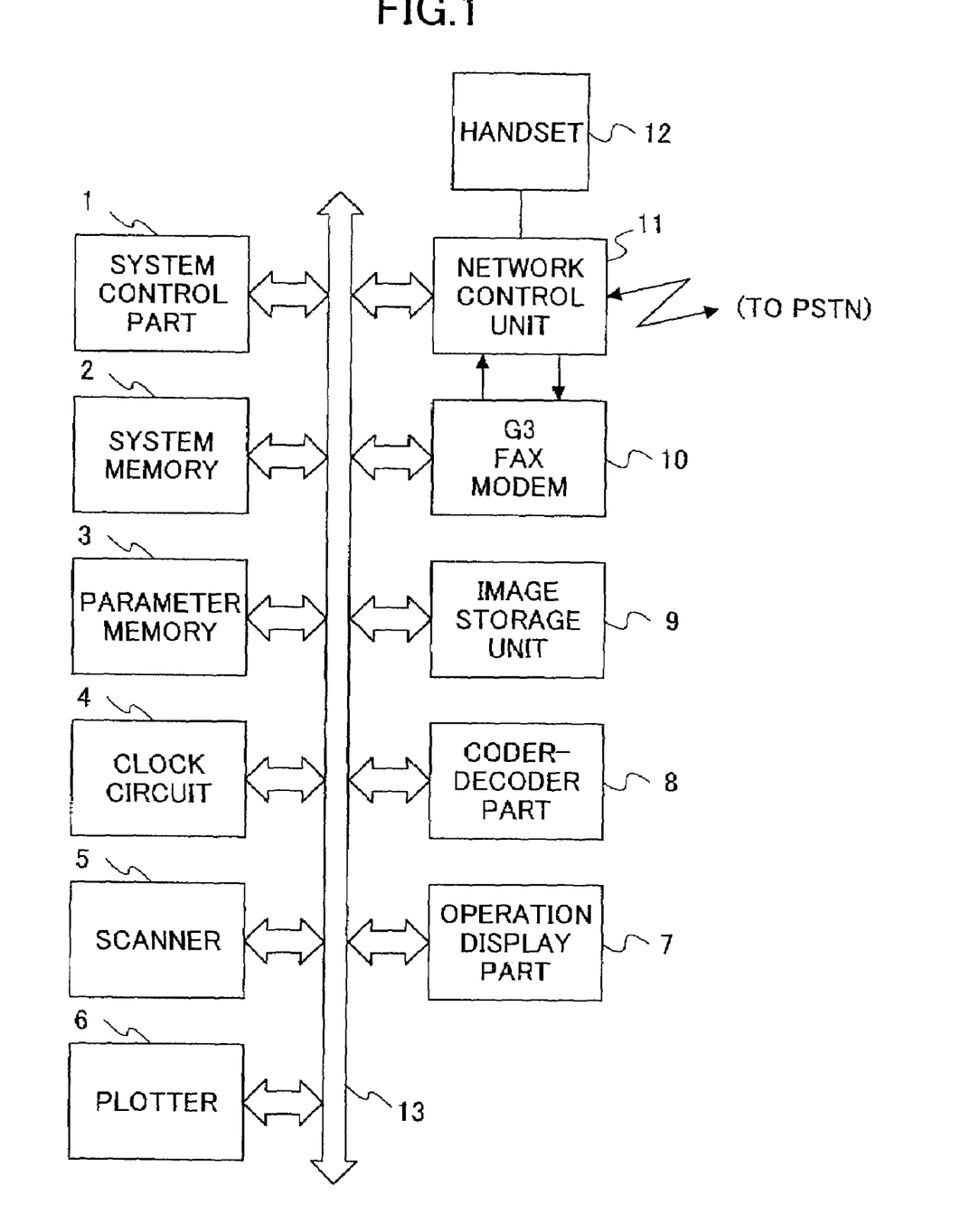
FIG. 1 is a block diagram of a Group-3 facsimile apparatus of an embodiment of the present invention.

FIG. 1 is a diagram showing a Group-3 facsimile apparatus of an embodiment of the present invention.

A system control part 1 performs control processes of each element of the Group-3 facsimile apparatus and a predetermined Group-3 facsimile transmission control procedure process. A system memory 2 serves as a storage area for storing control process programs executed by the system control part 1 and various data necessary for executing the process programs and also serves as a work area of the system control part 1. A parameter memory 3 serves as a storage area for storing various information uniquely used in the Group-3 facsimile apparatus. A clock circuit 4 is provided for outputting current time information.

A scanner 5 reads an original image with a predetermined resolution. A plotter 6 records and outputs the image with a predetermined resolution. An operation display part 7 is provided for the user to operate the Group-3 facsimile apparatus and is provided with various operational keys and various indicators.

A coder-decoder part 8 encodes to compress image signals and decodes the compressed image data to recover the original image data. An image storage unit 9 stores compressed image information of a plurality of images.

A Group-3 facsimile modem 10 provides modem functions of a Group-3 facsimile. Such modem functions include a low-speed modem function for communicating transmission procedure signals (V.21 modem), a high-speed modem function for mainly communicating image information (e.g., V.17 modem, V.34 modem, V.29 modem and V.27 ter modem) and a measurement function for measuring frequencies and durations of signals received through the line (signal measurement function).

A network control unit 11 connects the Group-3 facsimile apparatus to an analog public network PSTN and is provided with an automatic call send/receive function. The network control unit 11 is also provided with a handset 12 for conducting voice conversations via the Group-3 facsimile apparatus.

The system control part 1, the system memory 2, the parameter memory 3, the clock circuit 4, the scanner 5, the plotter 6, the operation display part 7, the coder-decoder part 8, the image storage unit 9, the Group-3 facsimile modem 10 and the network control unit 11 are connected to an internal bus 13. Data communications between each of the above elements are mainly made via the internal bus 13.

Data communications between the network control unit 11 and the Group 3 facsimile modem 10 are made directly between each other.

Figure 2:
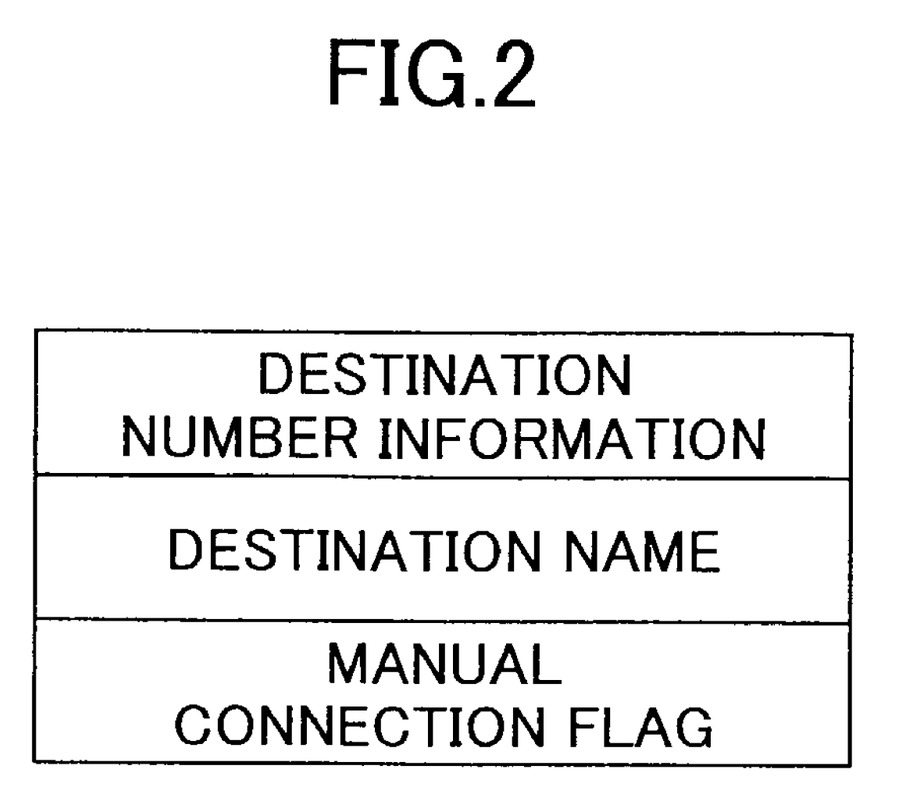
FIG. 2 is a diagram showing an example of a destination information table.

FIG. 2 is a diagram showing an example of a destination information table. The destination information table is created, for example, for each of one-touch dial numbers of a one-touch dial function or for each of abbreviated dialing numbers of an abbreviated dialing function. The destination information table contains destination number information (telephone number) that is preset for the one-touch dial number or the abbreviated dialing number, destination name indicating the name of a destination terminal and a manual connection flag indicating whether to perform a manual operation to connect to the destination terminal.

The manual connection flag is set to a value indicating "manual connection" in a case where the destination terminal supports functions such as a facsimile information service.

FIGS. 3A through 5B are diagrams showing menus presented to the user for presetting information into the destination information table.

Figure 3A:
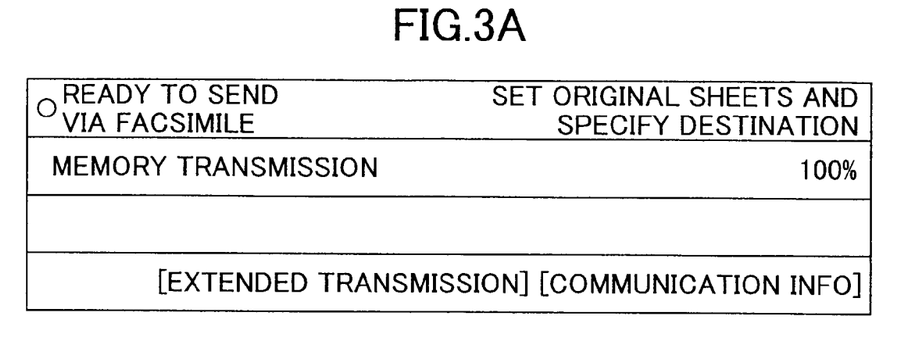
FIGS. 3A through 3D are diagrams showing menus presented to the user for presetting information into the destination information table.
Figure 3B:
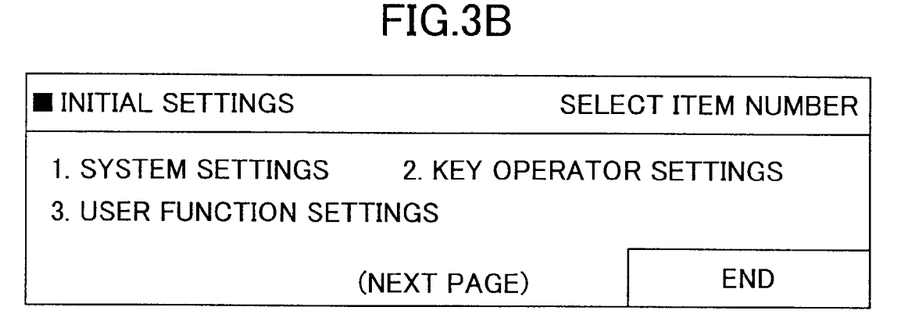

First of all, the menu of FIG. 3A is displayed on an initial screen of the operation display part 7. When the user operates an initial settings key (not shown) to an ON-state, the initial settings menu of FIG. 3B is presented to the user.

Figure 3C:
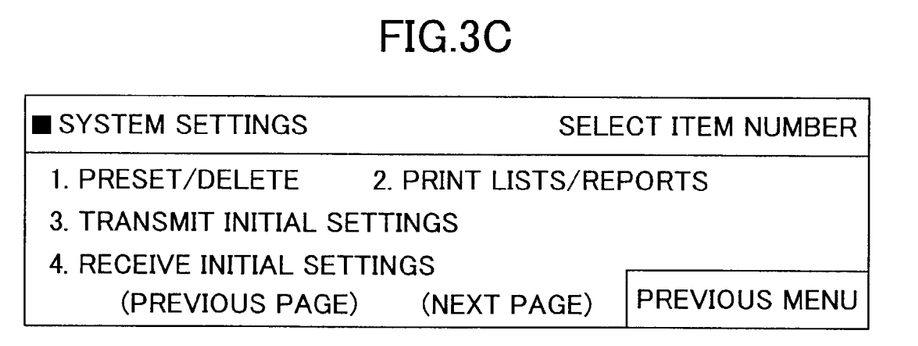
Figure 3D:
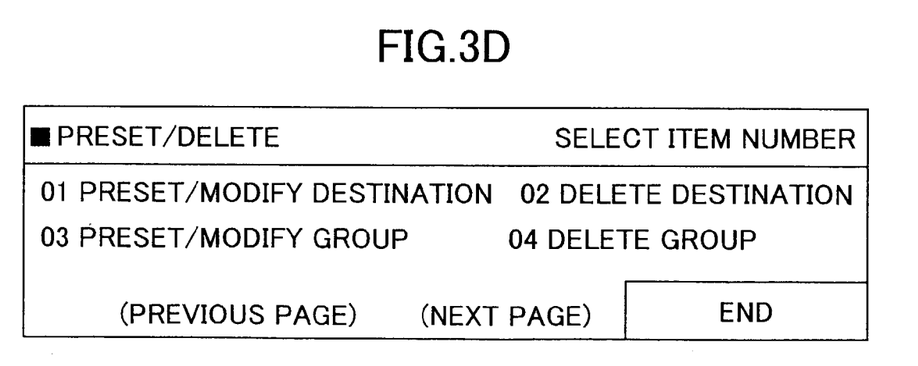

When the user selects "1" on the initial settings menu, the system settings menu of FIG. 3C is presented to the user. When the user selects "1" on this system settings menu, the preset/delete menu of FIG. 3D is presented to the user.

Figure 4A:
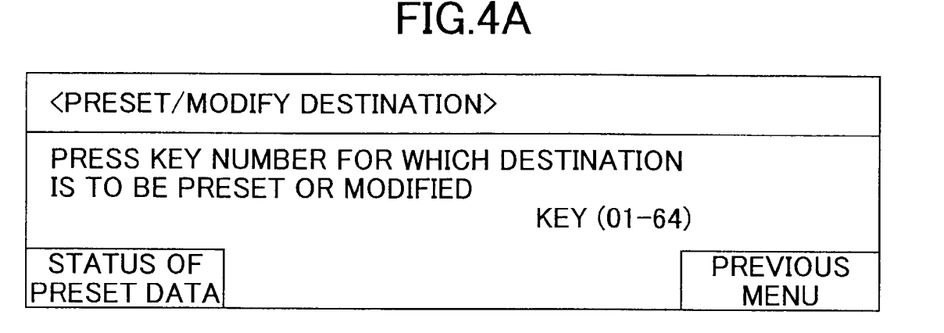
FIGS. 4A through 4D are diagrams showing menus presented to the user for presetting information into the destination information table.
Figure 4B:
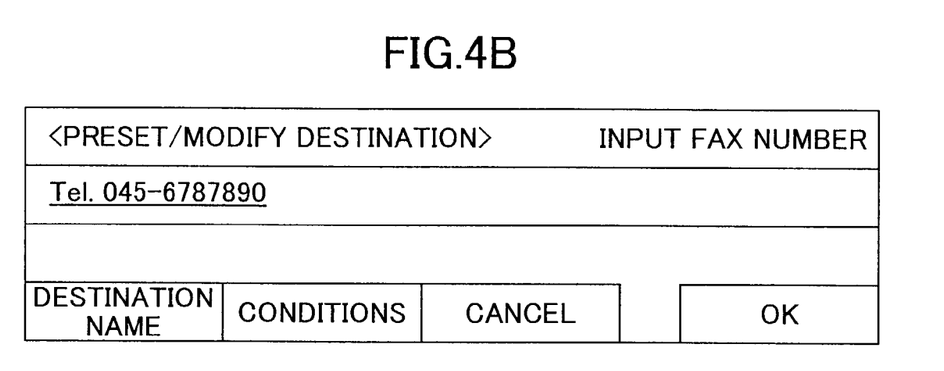

When the user selects "1" on the preset/delete menu, the "preset/modify destination" menu of FIG. 4A is presented to the user. On the "preset/modify destination" menu, when the user selects one of the one-touch dialing numbers 01 through 64, in this example, when key 01 is selected, the preset/modify menu for key 01 of FIG. 4B is presented to the user.

Figure 4C:
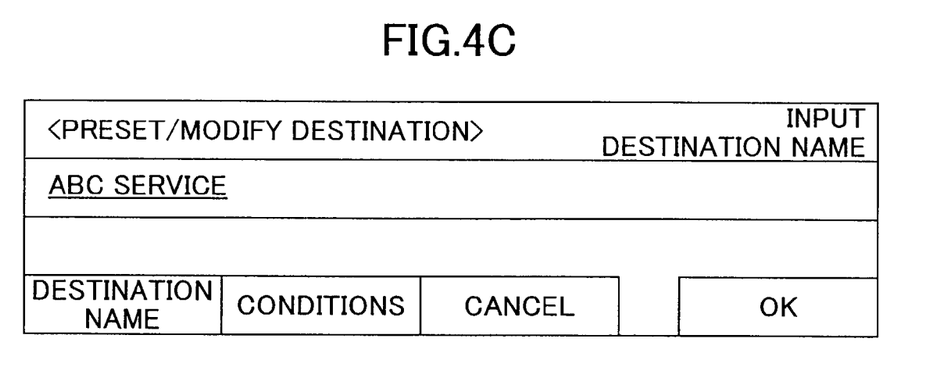
Figure 4D:
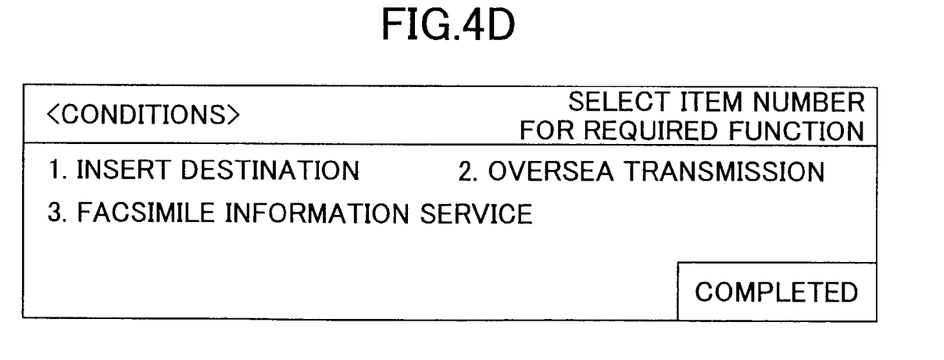

On the preset/modify menu, when the user inputs a telephone number (facsimile number) and selects "OK", the menu of FIG. 4C for inputting the name of destination is presented to the user. Then, when the user inputs the name of destination and selects "OK", the "conditions" preset menu of FIG. 4D is presented to the user.

Figure 5A:
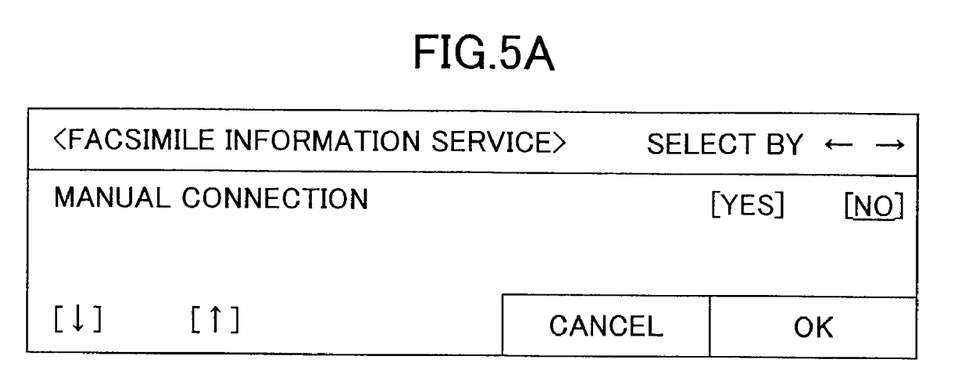
FIGS. 5A and 5B are diagrams showing menus presented to the user for presetting information into the destination information table.

On the "conditions" preset menu, for example, when the user selects "3" to select a facsimile information service, the menu of FIG. 5A is displayed so that the user can select whether to perform manual connection or not.

Figure 5B:
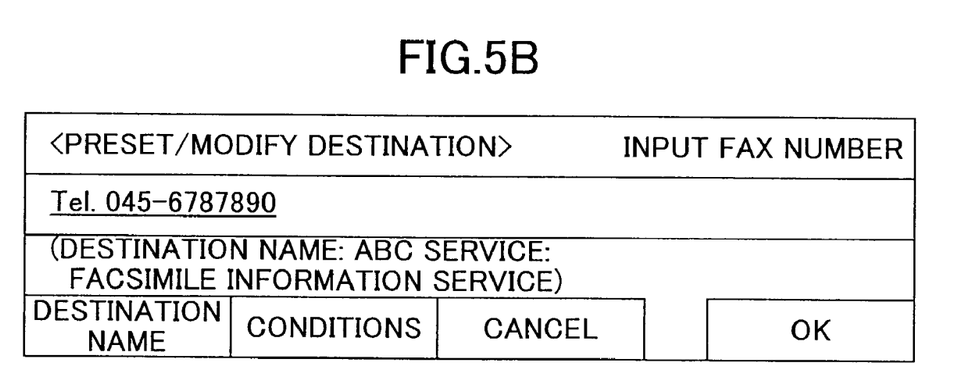

When the user selects a manual connection mode and selects "OK", the menu of FIG. 5B is displayed in which a list of information that is preset in the above-described manner is displayed. When the user further selects "OK", an information presetting process for one of the one-touch dialing numbers is completed.

Figure 6:
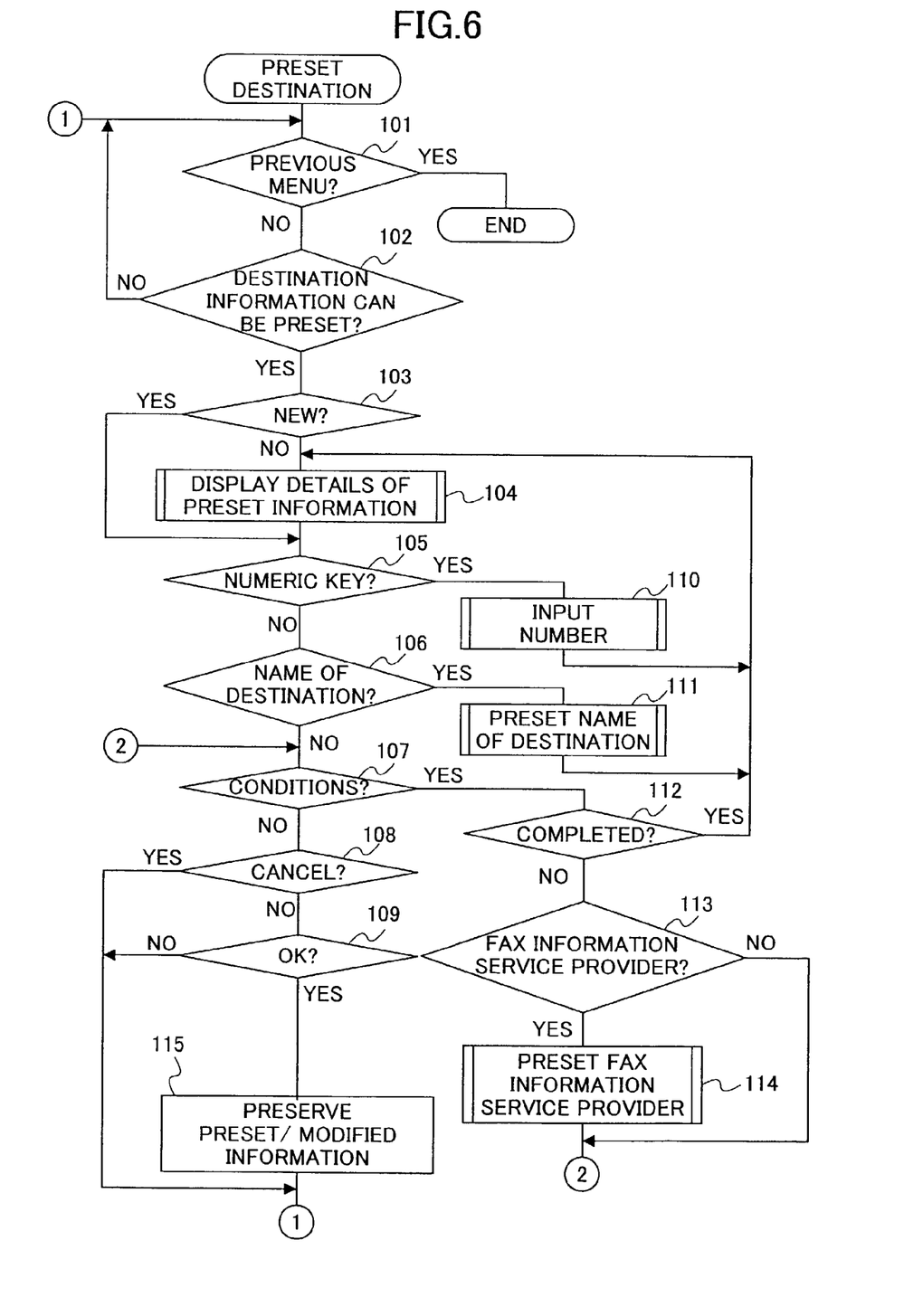
FIG. 6 is a flowchart of a process of presetting destination information according to the present invention.

FIG. 6 is a flowchart showing an example of a process performed upon storing information about the destination terminal.

First, an initial menu for presetting information about the destination terminal is displayed. Then, the process determines whether to return to a previous menu that has been displayed immediately before (step 101). If the result of step 101 is YES, the process is terminated. If the result of step 101 is NO, the process determines whether the input destination information is destination information that can be preset in the destination information table (step 102). If the result of step 102 is NO, the process returns to step 101.

When the result of step 102 is YES, or, the input destination information is destination information that can be preset in the destination information table, such as a one-touch dialing number, it is determined whether the destination information is new destination information (step 103). If the destination information has already been preset in the destination information table (NO in step 103), the information is retrieved from the destination information table and presented to the user (step 104).

Then, various determination steps are performed to determine whether numeric keys (not shown) are operated (step 105), whether the destination name is input (step 106), whether various conditions are input (step 107), whether a cancel button is selected (step 108) and whether an OK button is selected (step 109).

When the numeric keys are operated, or, the result of step 105 is YES, a process of presetting the number is performed (step 110). Then, the process returns to step 104 where the preset information is presented to the user.

When the destination name is input, or, the result of step 106 is YES, a predetermined step of inputting/presetting the name is performed (step 111). Then, the process returns to step 104 where the preset information is presented to the user.

When various conditions are input, or, the result of step 107 is YES, the process proceeds to step 112. While the result of step 112 is NO, or the user does not decide to terminate the process, the process proceeds to step 113 where it is determined whether facsimile information service is selected. When the result of step 113 is YES, or the facsimile information service is selected, the facsimile information service is preset (step 114) and the process returns to step 107. If the user selects to terminate the process, or, the result of step 112 is YES, the process returns to step 104 and the information that is preset up to that step is presented to the user.

If the "cancel" button is selected, or, the result of step 108 is YES, the process returns to step 101. If the "OK" button is selected, or, the result of step 109 is YES, the information preset up to that step and the modified information are preserved (step 115) and the process returns to step 101.

Figure 7:
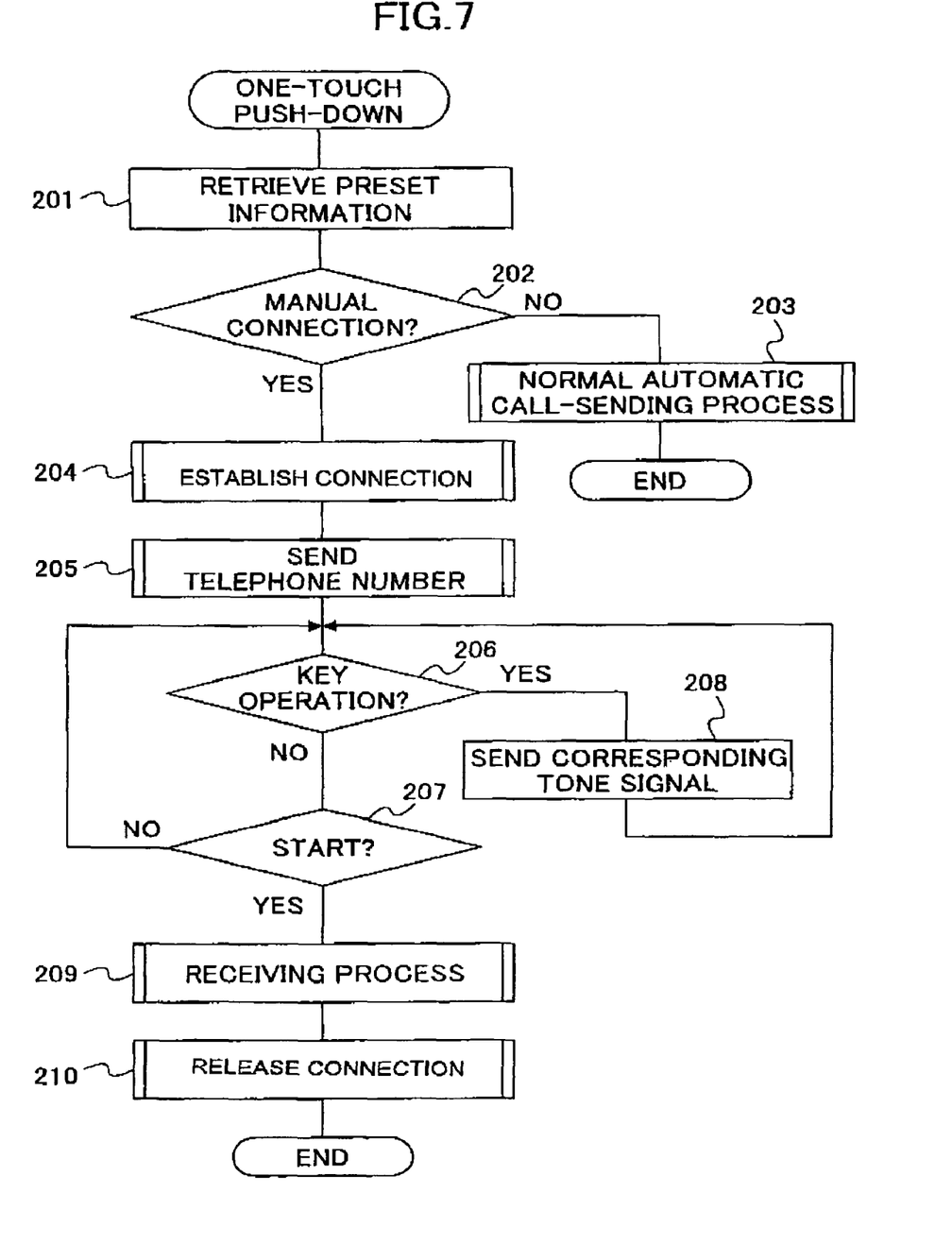
FIG. 7 is a flowchart of a process of an embodiment of the present invention that is performed when a one-touch dial is operated.

FIG. 7 is an example of a flowchart of a process an embodiment of the present invention that is performed when a one-touch dial is operated.

First, the preset information is retrieved (step 201) and it is determined whether the manual connection flag is set to a value indicating "manual connection" (step 202). If the result of step 202 is NO, a normal automatic calling process is performed (step 203).

When the result of step 202 is YES, or, when the user operates one of the one-touch dialing numbers, the connection is established (step 204). Then, using the preset destination information, a telephone number is sent on the network (step 205).

Thus, a call is sent to the facsimile information service terminal and the facsimile apparatus is connected to the facsimile information service terminal of the facsimile information service provider. Information such as a guidance voice of the facsimile information service is sent to the user from the facsimile information service terminal. Then, the user follows the guidance voice to perform necessary key operations in order to access the desired information. In such a manner, information is selectively processed in an interactive manner between the facsimile information service terminal and the user. Finally, information required by the user is retrieved.

Therefore, the process waits until the user operates one of the keys or a start key (not shown) (a NO loop including steps 206 and 207).

When the user operates one of the keys, or, the result of step 206 is YES, corresponding tone signals are sent to the facsimile information service terminal (step 208) and the process returns to step 206. When the user finally reaches the desired information and operates the start key to an ON state, or, the result of step 207 is YES, a predetermined Group-3 facsimile receiving process is performed and facsimile image information is received from the facsimile information service terminal (step 209). After the receiving process, the connection is released (step 210) and the process is terminated.

In this manner, information indicating whether to perform manual connection is stored in the preset information of the one-touch dialing number. Therefore, according to the present embodiment, connections between the facsimile apparatus and the facsimile information service terminal can be established using one-touch dialing numbers. This significantly reduces efforts required by the user. Further, according to the present embodiment, later input operations of the telephone numbers being made by the user can be reduced.

Now, it is to be noted that data interactively communicated between the facsimile information service provider and the user have certain predetermined contents. Therefore, when procedures for obtaining information required by the user are known, the procedures can be prestored in the facsimile apparatus to perform an automatic receiving operation for automatically retrieving information required by the user.

Figure 8:
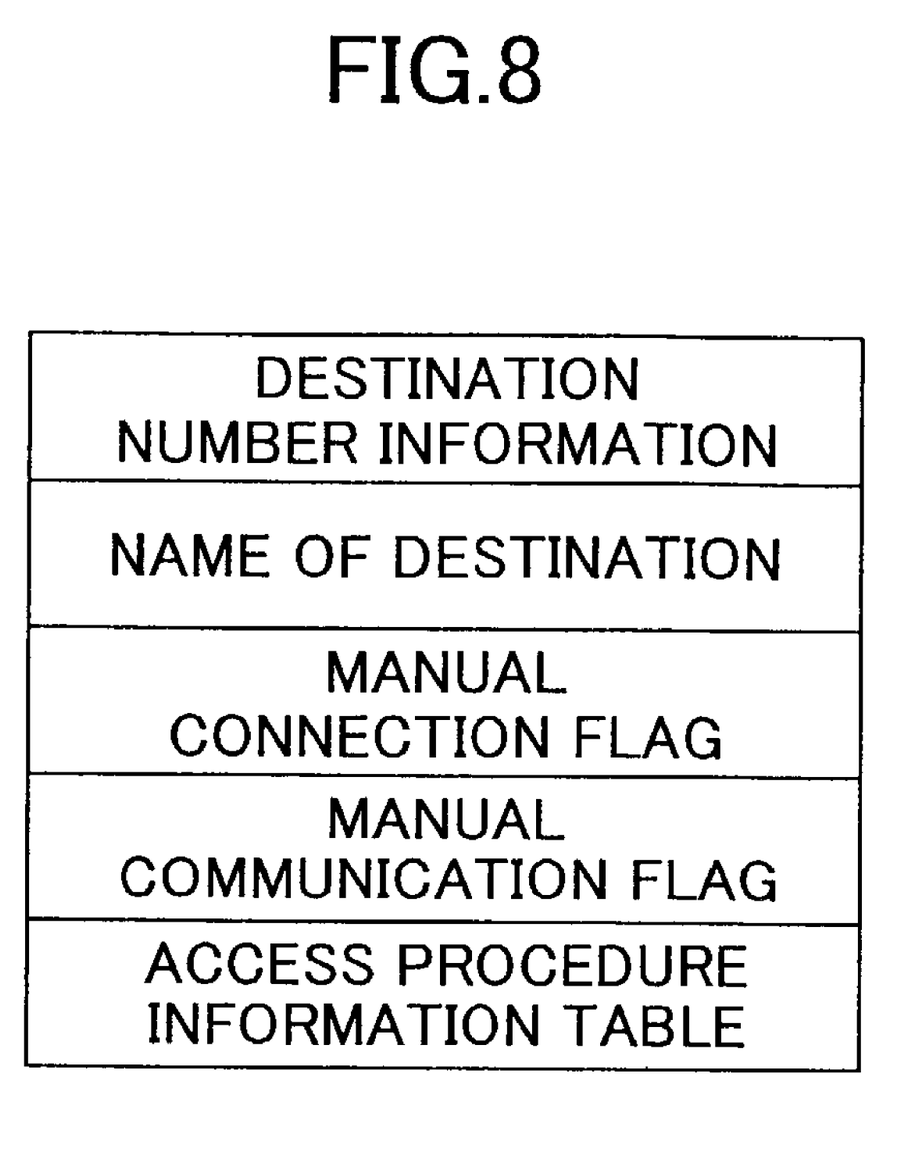
FIG. 8 is a diagram showing another example of a destination information table.

To this end, as shown in FIG. 8, the destination information table is further provided with a manual communication flag and an access procedure information table. The manual communication flag indicates whether or not to perform an automatic receiving operation. The access procedure information table stores, in a step-by-step manner, contents of data to be processed interactively between the facsimile information service provider and the user. For example, the content of data for one of the steps may be the content of tone signals to be transmitted (PB signal sequence) and pausing periods.

Figure 9:
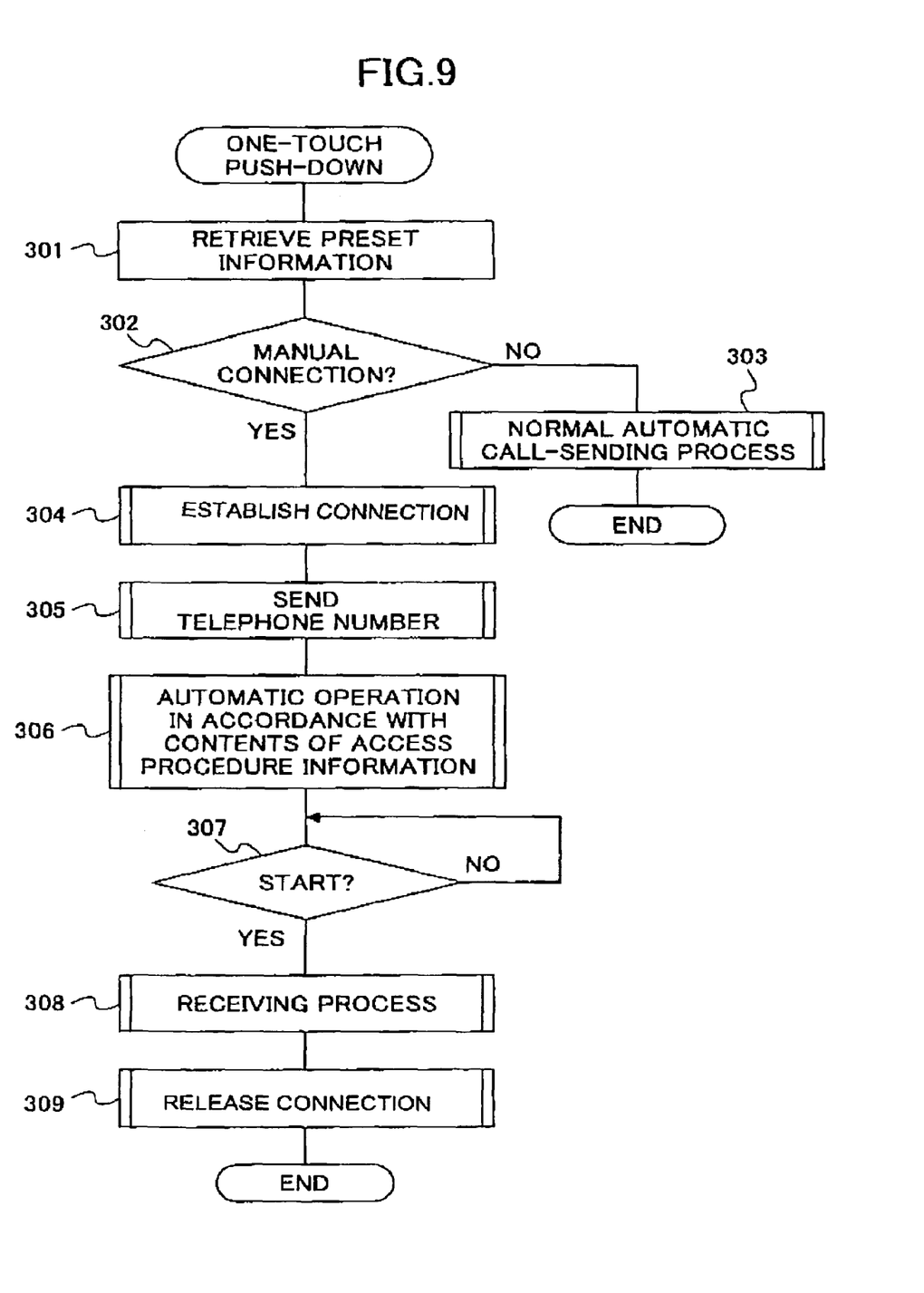
FIG. 9 is a flowchart of a process of another embodiment of the present invention that is performed when a one-touch dial is operated.

FIG. 9 is a flowchart showing an example of a process performed when a one-touch dial is operated.

First, the preset information is retrieved (step 301) and it is determined whether the manual connection flag is set to a value indicating "manual connection" (step 302). If the result of step 302 is NO, a normal automatic calling process is performed (step 303).

When the result of step 302 is YES, or, when the user operates one of the one-touch dialing numbers, the connection is established (step 304). Then, using the preset destination information, a telephone number is sent on the network (step 305).

Thus, a call is sent to the facsimile information service terminal and the facsimile apparatus is connected to the facsimile information service terminal of the facsimile information service provider. Information such as a guidance voice of the facsimile information service is sent to the user from the facsimile information service terminal. Referring to the contents of the access procedure information table, an automatic operation is performed (step 306) so as to perform an operation for retrieving desired information preset by the user.

During this retrieving process, the user listens to the automatic operation performed by the Group 3 facsimile apparatus and when the operation reaches the desired information, the user operates the start key.

After step 306, the process waits until the start key is turned ON (NO loop at step 307). When the start key is operated and the result of step 307 is YES, the predetermined (Group-3 facsimile receiving process is performed and facsimile image information is received from the facsimile information service terminal (step 308). After the receiving operation, the connection is released (step 309) and the process is terminated.

As has been described above, in the present embodiment, the preset information of the one-touch dialing number contains information indicating whether or not to perform manual connection. Therefore, connections between the facsimile apparatus and the facsimile information service terminal can be established using one-touch dialing. This significantly reduces efforts required by the user. Further, according to the present embodiment, later input operations of telephone numbers made by the user can be reduced. Also, according to the present embodiment, procedures performed for retrieving information from the facsimile information service terminal are prestored. Therefore, this significantly reduces efforts required by the user.

Figure 10:
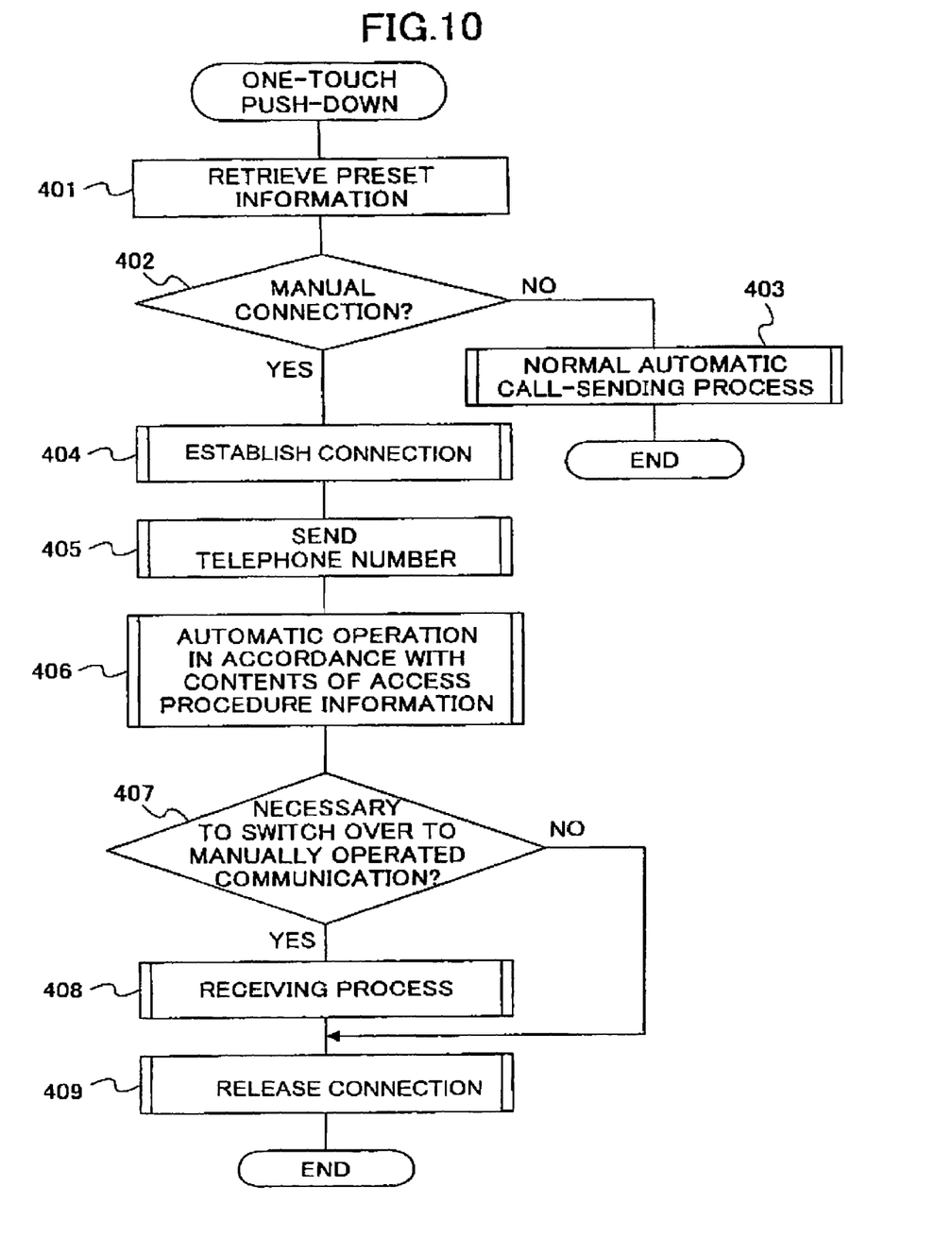
FIG. 10 is a flowchart of a process of still another embodiment of the present invention that is performed when a one-touch dial is operated.

FIG. 10 is a flowchart of a process of still another embodiment of the present invention that is performed when a one-touch dial is operated.

First, the preset information is retrieved (step 401) and it is determined whether the manual connection flag is set to a value indicating "manual connection" (step 402). If the result of step 402 is NO, a normal automatic calling process is performed (step 403).

When the result of step 402 is YES. or, when the user operates one of the one-touch dialing numbers, the connection is established (step 404). Then, using the preset destination information, a telephone number is sent on the network (step 405).

Thus, a call is sent to the facsimile information service terminal and the facsimile apparatus is connected to the facsimile information service terminal of the facsimile information service provider. Information such as a guidance voice of the facsimile information service is sent to the user from the facsimile information service terminal. Referring to the contents of the access procedure information table, an automatic operation is performed (step 406) so as to perform an operation for retrieving desired information preset by the user.

Then, it is determined whether the manual communication flag is set to a value indicating "to communicate" (step 407). When the result of step 407 is YES, the predetermined Group-3 facsimile receiving process is performed and facsimile image information is received from the facsimile information service terminal (step 408). After the receiving operation, the connection is released (step 409) and the process is terminated.

Thus, according to the present embodiment, the preset information of the one-touch dialing number contains information indicating whether or not to perform manual connection. Therefore, connections between the facsimile apparatus and the facsimile information service terminal can be established using one-touch dialing. Accordingly, this significantly reduces efforts required by the user. Further, according to the present embodiment, later input operations of the telephone numbers made by the user can be reduced. Also, according to the present embodiment, procedures performed for retrieving information from the facsimile information service terminal are prestored. This significantly reduces efforts required by the user.

Figure 11:
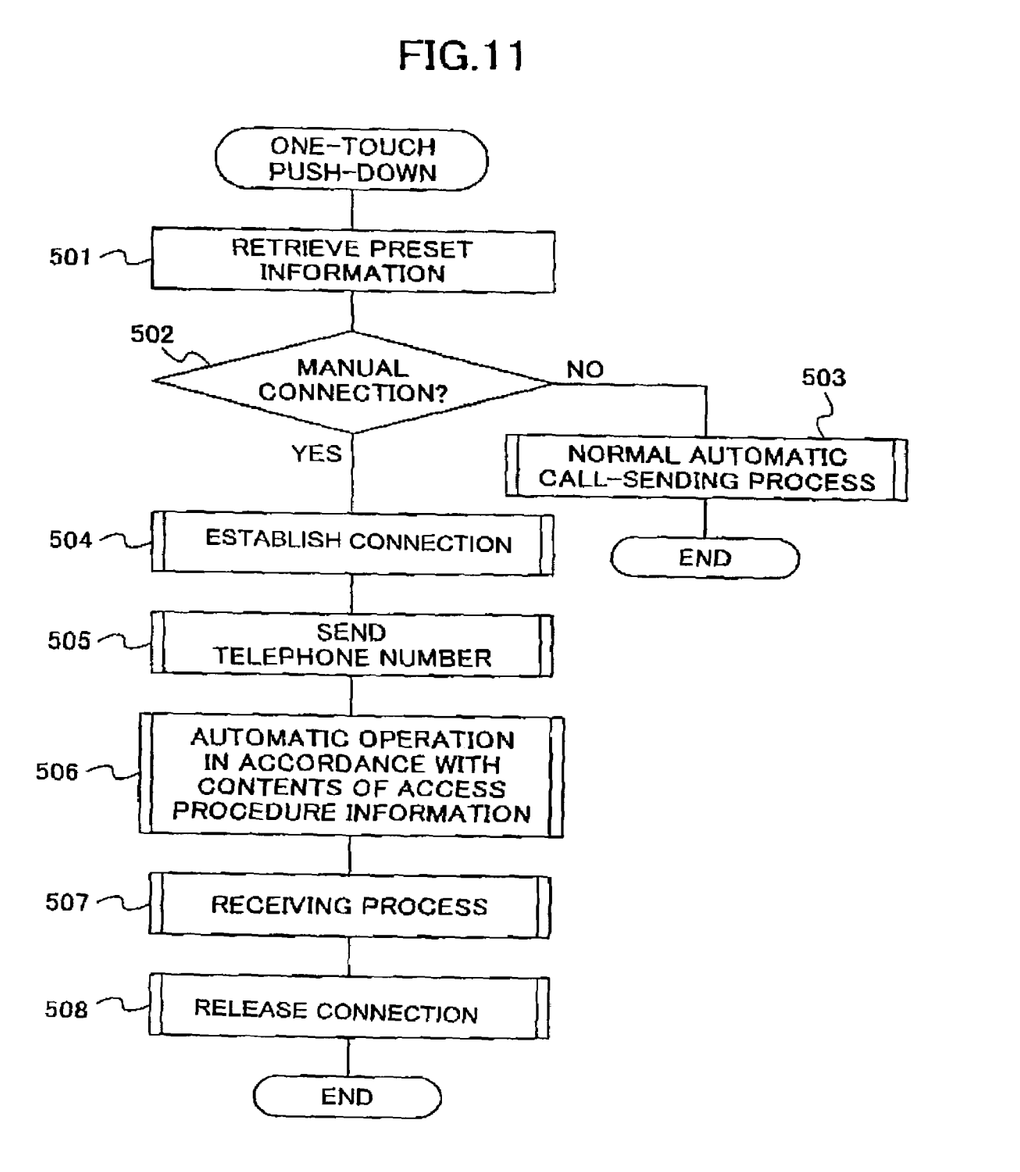
FIG. 11 is a flowchart of a process of yet another embodiment of the present invention that is performed when a one-touch dial is operated.

FIG. 11 is a flowchart of a process of yet another embodiment of the present invention that is performed when a one-touch dial is operated.

First, the preset information is retrieved (step 501) and it is determined whether the manual connection flag is set to a value indicating "manual connection" (step 502). If the result of step 502 is NO, a normal automatic calling process is performed (step 503).

When the result of step 502 is YES, or, when the user operates one of the one-touch dialing numbers, the connection is established (step 504). Then, using the preset destination information, a telephone number is sent on the network (step 505).

Thus, a call is sent to the facsimile information service terminal and the facsimile apparatus is connected to the facsimile information service terminal of the facsimile information service provider. Information such as a guidance voice of the facsimile information service is sent to the user from the facsimile information service terminal. Referring to the contents of the access procedure information table, an automatic operation is performed (step 506) so as to perform an operation for retrieving desired information preset by the user.

Then, the predetermined Group-3 facsimile receiving process is performed and facsimile image information is received from the facsimile information service terminal (step 507). After the receiving operation, the connection is released (step 508) and the process is terminated.

Thus, according to the present embodiment, the preset information of the one-touch dialing number contains information indicating whether or not to perform manual connection. Therefore, connections between the facsimile apparatus and the facsimile information provider can be established using one-touch dialing. Accordingly, this significantly reduces efforts required by the user. Further, according to the present embodiment, later input operations of the telephone numbers made by the user can be reduced. Also, according to the present embodiment, procedures performed for retrieving information from the facsimile information service terminal are prestored. Therefore, this significantly reduces efforts required by the user.

It is to be noted that in the above-described embodiments, the present invention has been described with reference to the Group-3 facsimile apparatus but the scope of the present invention is not limited to such embodiments and may also be applied to other types of communication terminal apparatuses.

Further, the present invention is not limited to these embodiments, and variations and modifications may be made without departing from the scope of the present invention.

The present application is based on Japanese priority application No. 2001-215666 filed on Jul. 16, 2001, the entire contents of which are hereby incorporated by reference.

What is claimed is:

1. A communication terminal apparatus comprising:
a communication part capable of performing communication procedures after a connection has been established;
an automatic call-sending part for sending calls in an automatic process; and
a destination information storage part in which destination information associated with destination terminals is preset and which is referred to by said automatic call-sending part,
wherein said destination information storage part further includes an access procedure information table associated with destination number information, in which contents of data to be processed interactively between a facsimile information service provider and a user in a step-by-step manner are stored beforehand, and, when the destination number information is selected by the user, the communication part performs an automatic operation by referring to the contents of the data in the access procedure information table.

2. The communication terminal apparatus as claimed in claim 1, wherein said destination information further includes a service number and additional information used after the connection has been established, said service number and said additional information being used for receiving service information from said destination terminal of the facsimile service information provider.

3. The communication terminal apparatus as claimed in claim 1, wherein said destination information further includes a service number and additional information used after the connection has been established, said service number and said additional information being used for performing predetermined procedures for receiving service information from said destination terminal), said communication part being started up in an information receiving step in said predetermined procedures for receiving service information from said destination terminal.

4. The communication terminal apparatus of claim 1,
wherein said destination information storage part stores a service number and additional information used after a connection has been established, and
wherein, when a connection is established between said communication terminal apparatus and a destination terminal, said service number and said additional information are used for performing predetermined procedures for receiving service information from said destination terminal said communication part being started up in an information receiving step in said predetermined procedures for receiving service information from said destination terminal.

5. The communication terminal apparatus as claimed in claim 1 further comprising a facsimile information receiving part for performing, when a start key is operated after the automatic process is performed, a facsimile receiving process to receive facsimile image information from the destination terminal.

6. The communication terminal apparatus as claimed in claim 1 further comprising a facsimile information receiving part for performing, when a manual communication flag is set to a value indicating that communication is to be performed, a facsimile receiving process to receive facsimile image information from the destination terminal.

7. A method of receiving service information from a facsimile service information provider a communication terminal apparatus, said method comprising the steps of:
a) presetting destination information used for an automatic call-sending operation;
b) storing an access procedure information table associated with destination number information, in which contents of data to be processed interactively between the facsimile information service provider and a user in a step-by-step manner are stored beforehand;
c) performing an automatic call-sending operation by referring to the contents of the data in the access procedure information table, when the corresponding destination number information is selected by the user;
d) receiving service information from said facsimile service information provider; and
e) reconnecting the line.

8. The method as claimed in claim 7, wherein said destination information further includes a service number and additional information used after the connection has been established, said service number and said additional information being used for receiving service information from said destination terminal of the facsimile service information provider.

9. The method as claimed in claim 7, wherein said destination information further includes a service number and additional information used after the connection has been established, said service number and said additional information being used for performing predetermined procedures for receiving service information from said destination terminal, said communication part being started up in an information receiving step in said predetermined procedures for receiving service information from said destination terminal.

10. The method of claim 7,
wherein said destination information includes a service number and additional information used after the connection has been established, and
wherein when a connection is established between said communication terminal apparatus and the destination terminal, predetermined procedures for receiving service information from said destination terminal using said service number and said additional information are performed, a communication step being started up in an information receiving step in said predetermined procedures for receiving service information from said destination terminal.

* * * * *